United States Patent
Inamoto

(10) Patent No.: US 7,729,021 B2
(45) Date of Patent: Jun. 1, 2010

(54) IMAGE PROCESSING APPARATUS AND METHOD THEREOF, AND IMAGE FORMING APPARATUS USING THE IMAGE PROCESSIING APPARATUS

(75) Inventor: Hirohisa Inamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 686 days.

(21) Appl. No.: 11/588,467

(22) Filed: Oct. 26, 2006

(65) Prior Publication Data

US 2007/0097467 A1   May 3, 2007

(30) Foreign Application Priority Data

Oct. 27, 2005   (JP)   ............... 2005-313087

(51) Int. Cl.
 *G03F 3/08* (2006.01)
(52) U.S. Cl. .................. 358/518; 358/1.7; 358/1.9; 382/162; 382/167
(58) Field of Classification Search ........... 358/1.7, 358/1.9, 518; 382/162, 167
See application file for complete search history.

(56) References Cited

U.S. PATENT DOCUMENTS

| | | | | |
|---|---|---|---|---|
| 6,693,752 | B2 * | 2/2004 | Azumai | 359/896 |
| 6,885,485 | B2 * | 4/2005 | Hama | 359/204.1 |
| 6,993,184 | B2 * | 1/2006 | Matsugu | 382/173 |
| 2002/0028027 | A1 * | 3/2002 | Koyama | 382/289 |
| 2004/0190019 | A1 * | 9/2004 | Li et al. | 358/1.9 |
| 2004/0239967 | A1 * | 12/2004 | Wen | 358/1.9 |
| 2005/0018258 | A1 | 1/2005 | Miyagi | |
| 2005/0157317 | A1 * | 7/2005 | Butterfield et al. | 358/1.9 |
| 2005/0207661 | A1 | 9/2005 | Miyagi | |
| 2006/0017795 | A1 * | 1/2006 | Nomura et al. | 347/232 |
| 2006/0092264 | A1 * | 5/2006 | Matsuzaki et al. | 347/233 |

FOREIGN PATENT DOCUMENTS

| | | |
|---|---|---|
| JP | 2-297574 | 12/1990 |
| JP | 08-085236 | 4/1996 |
| JP | 08-146317 | 6/1996 |
| JP | 09-314911 | 12/1997 |
| JP | 10-062700 | 3/1998 |
| JP | 2000-112206 | 4/2000 |
| JP | 2003-274143 | 9/2003 |
| JP | 2004-074509 | 3/2004 |
| JP | 2004-122692 | 4/2004 |

* cited by examiner

*Primary Examiner*—Mark K Zimmerman
*Assistant Examiner*—Miya J Cato
(74) *Attorney, Agent, or Firm*—Blakely, Sokoloff, Taylor & Zafman LLP

(57) ABSTRACT

An image processing apparatus is disclosed. The image processing apparatus includes a detector, a parameter calculating section, a storing section, a correction section, and a pseudo continuous tone processing section. The detector detects an amount of an out of color registration of a color laser printer. The parameter calculating section calculates a correction parameter based on the amount of the out of color registration detected by the detector. The storing section stores the calculated correction parameter. The correction section corrects input image data based on the calculated correction parameter by reading from the storing section. The pseudo continuous tone processing section applies a pseudo continuous tone process to the corrected input image data.

9 Claims, 14 Drawing Sheets

IMAGE PROCESSING APPARATUS AND METHOD THEREOF, AND IMAGE FORMING APPARATUS USING THE IMAGE PROCESSIING APPARATUS

PRIORITY

The present application claims priority to and incorporates by reference the entire contents of Japanese priority document 2005-313087, filed in Japan on Oct. 27, 2005.

BACKGROUND OF THE INVENTION

1. Field of the Invention

The present invention generally relates to an image processing apparatus, an image forming apparatus using the image processing apparatus, an image processing method, a computer-readable recording medium storing a program of the method, and an image forming method using the image processing method.

2. Description of the Related Art

In a general-use laser printer, in many cases, the number of tones by which dots of image data are expressed is insufficient to obtain a natural image. Therefore, a pseudo continuous tone process is applied to original image data.

When image data having multi tones are output by application of the pseudo continuous tone process, input image data are processed mainly in the following processes. That is, the processes are an image data writing process onto a photoconductor to form a latent image, a developing process of the latent image on the photoconductor to form a toner image, a transferring process of the developed toner image onto a recording medium, and a fixing process of the transferred toner image. FIG. 1 is a schematic diagram showing an image data writing optical system in a laser printer. Referring to FIG. 1, the above processes are described in detail.

Image data are converted into laser beams having intensity of several steps via an image data processing section 41, a laser driving circuit 43, and a light source 22e. The diameter of a laser beam is converted into a diameter suitable to be transmitted via lenses 24e and 28d, and a mirror 30. Further, the laser beam is scanned by a polygon mirror 32. The laser beam output from the polygon mirror 32 is input to a fθ lens 34d and the laser beam is formed so that the image height (measured in the width direction of the fθ lens 34d) is linearly changed for a scanning angle by the fθ lens 34d. The diameter of the laser beam is converted into a diameter suitable for writing on a photoconductor 14 by a cylindrical lens 36d and the laser beam is irradiated onto the photoconductor 14.

An electric charge is generated on the photoconductor 14 corresponding to the amount of the laser beam. Therefore, when toners having a reverse electric charge come in contact with the photoconductor 14, the toners corresponding to the amount of the laser beam are adhered to the photoconductor 14 and a toner image is developed. When a paper which is charged more greatly than the photoconductor 14 approaches the photoconductor 14, the toner image is transferred to the paper. Since the toner image transferred on the paper is only put on the paper, the toner image is fixed on the paper by applying heat or pressure to the toner and the paper.

In the above processes, a so-called out of color registration such as skewing of an image, a bow-shaped distortion in an image, and a change of a scale factor of an image may occur, due to insufficient accuracy of components of which the image data writing optical system is composed and errors when the components are assembled.

The skewing of the image is caused by a difference between the scanning direction of a laser beam and the main scanning direction on the photoconductor 14. FIG. 2 is a schematic diagram illustrating the skewing of the image. In FIG. 2, on the photoconductor 14, the continuous arrow line is the scanning direction originally desired to write a laser beam and the dotted arrow line is the actual scanning direction of the laser beam which causes the skewing. The inclination of the dotted arrow line is caused by errors when installing lenses and insufficient accuracy of the surface of the polygon mirror 32. The bow-shaped distortion of the image is caused by deforming of the photoconductor 14 to be bow-shaped or bending of a paper on which the image is formed. The change of the scale factor of the image is caused by insufficient accuracy of lens characteristics.

When the out of color registration occurs, the image is distorted and the image quality is degraded. In order to prevent occurrence of the out of color registration, high accuracy is required in manufacturing various components and installing them; consequently, the cost is increased. Therefore, a technology is desired in which technology the out of color registration is restrained and the cost is not increased while maintaining high quality of images.

In Japanese Laid-Open Patent Application No. 8-146317 and Japanese Patent No. 2749367, the out of color registration is corrected by changing an optical path of a laser beam which is used to form an image on a photoconductor.

However, in order to realize the technologies in Japanese Laid-Open Patent Application No. 8-146317 and Japanese Patent No. 2749367, it is required that specific hardware for correcting the out of color registration be disposed in an optical system of a printer. Therefore, the size of the apparatus may become large and the cost may be increased. In addition, since the correction of the skewing and the correction of the bow-shaped distortion mutually influence therebetween, when one distortion is corrected, the other distortion is increased. Further, since the correction is executed by hardware, accuracy and performance beyond the characteristics of the hardware cannot be realized.

In Japanese Laid-Open Patent Application No. 10-62700, a technology is disclosed in which technology the scale factor is corrected by modulating a video clock which is used for forming an image on a photoconductor.

Further, in Japanese Laid-Open Patent Application No. 8-85236 and Japanese Laid-Open Patent Application No. 2000-112206, methods are disclosed in which methods the out of color registration at the time of color printing is corrected by image processing. However, in a printer which executes printing by using a pseudo continuous tone process, when the method is applied to image data after the pseudo continuous tone process is applied, a pixel used for the correction of the scale factor interferes with a spatial frequency of the pseudo continuous tone which is used for printing; consequently, interference fringes appear on an output image. In order to solve this problem, in Japanese Laid-Open Patent Application No. 2003-274143, correction is executed so that interference does not occur after the pseudo continuous tone process.

However, in Japanese Laid-Open Patent Application No. 2003-274143, when the correction is executed after executing the pseudo continuous tone process, the correction is limited in some cases. Especially, the limitation can be a great problem in a case where the resolution does not change before and after executing the pseudo continuous tone process. One example is described below.

In the example, a case is studied in which an image larger than an original image is output due to an error of the scale factor. When the correction of the scale factor is executed after executing the pseudo continuous tone process, one pixel must be thinned out from several pixels. A case is described in which pixels at specific positions are simply thinned out in the main scanning direction. FIG. 3 is a diagram showing pixels of an image in a pixel thinning out process. In FIG. 3, a rectangle is a pixel and black pixels are to be thinned out. As shown in FIG. 3(*a*), when a black pixel overlaps a thin line, the thin line vanishes.

In Japanese Laid-Open Patent Application No. 2003-274143, in order to solve this problem, as shown in FIG. 3(*b*), the positions of the pixels to be thinned out are shifted among lines in the main scanning direction. With this, all the thin lines are prevented from vanishing. However, in this case, the thin lines partially vanish and some original continuous lines become dashed lines.

SUMMARY OF THE INVENTION

An image processing apparatus and method thereof, and image forming apparatus using the image processing apparatus are described. In one embodiment, an image processing apparatus, comprises a detecting section to detect an amount of an out of color registration in an image forming apparatus of an electrophotographic system and to calculate a correction parameter of the out of color registration from the obtained amount of the out of color registration and to store the correction parameter; a correction unit which corrects image data to be input to the image forming apparatus based on the correction parameter; and a pseudo continuous tone processing section to apply a pseudo continuous tone process to the image data corrected by the correction section.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENTS

Figure 1:
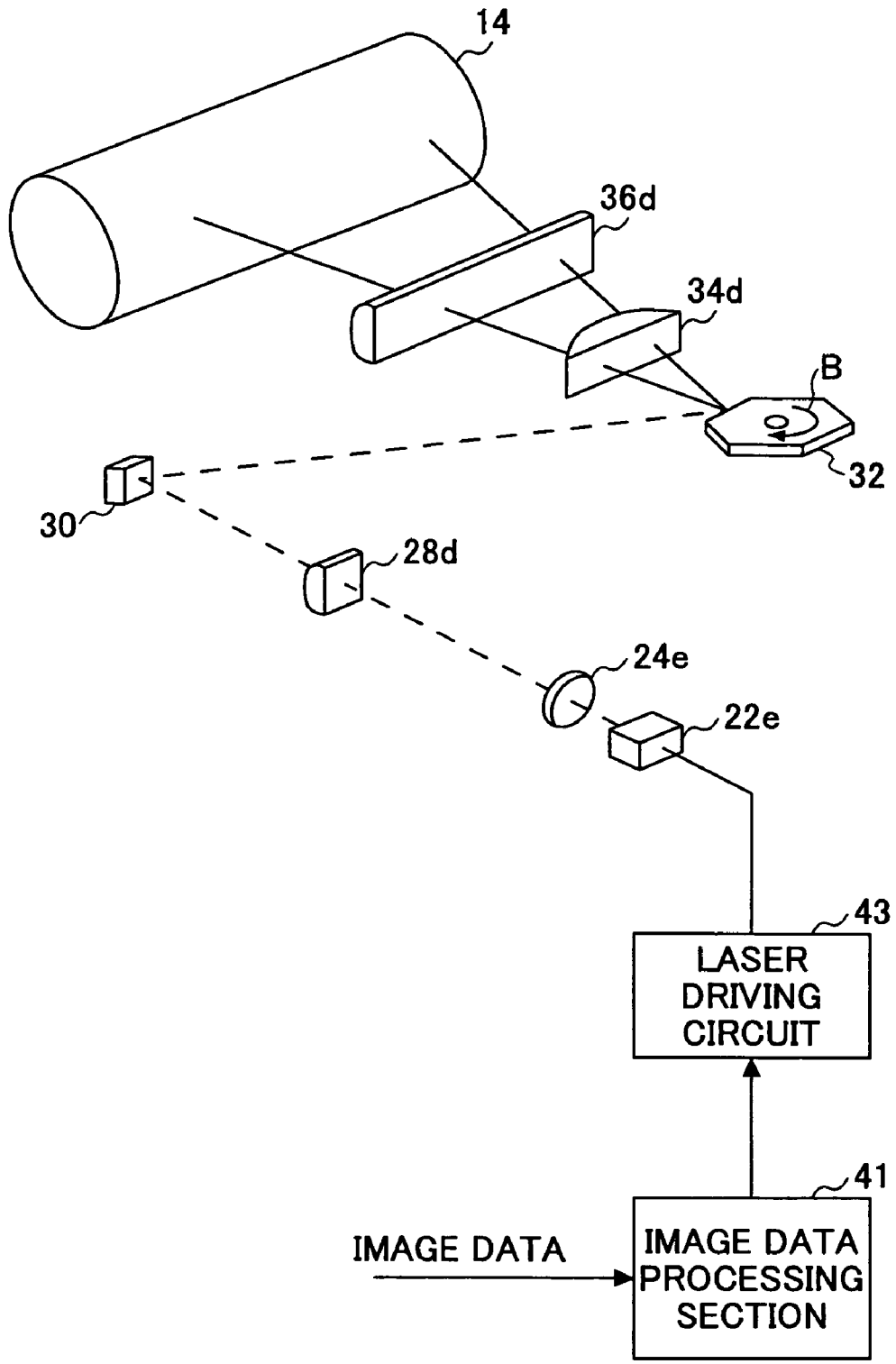
FIG. 1 is a schematic diagram showing an image data writing optical system in a laser printer.
Figure 2:
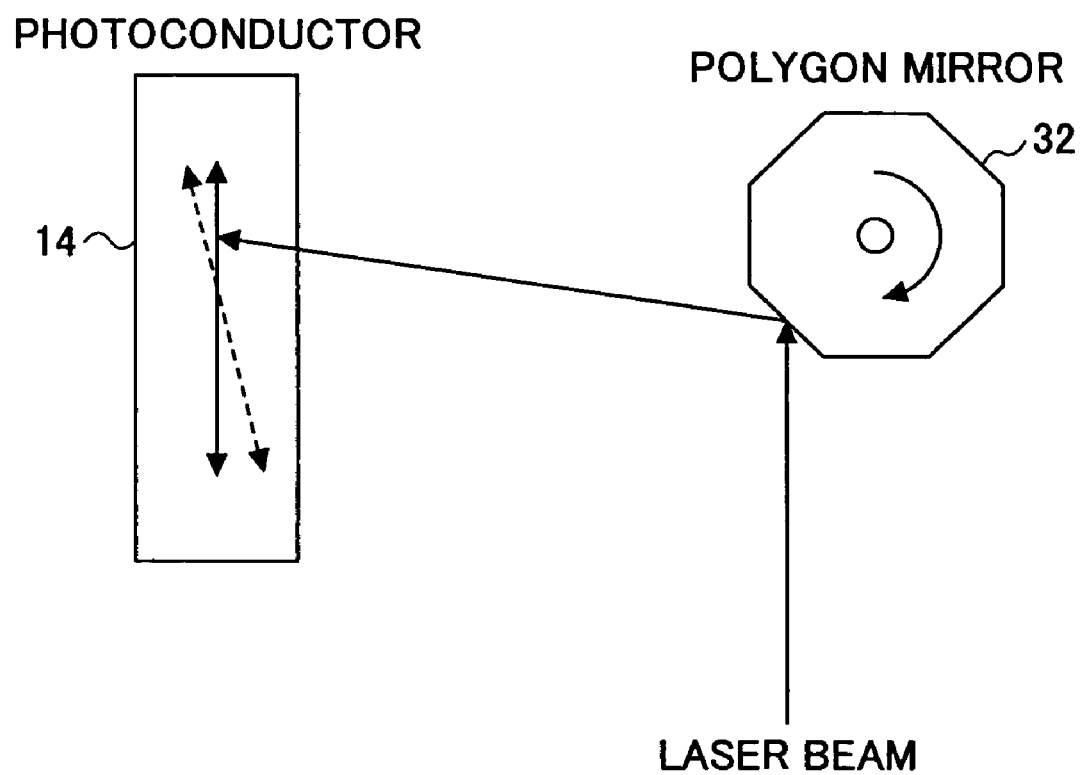
FIG. 2 is a schematic diagram illustrating skewing of an image.
Figure 3:
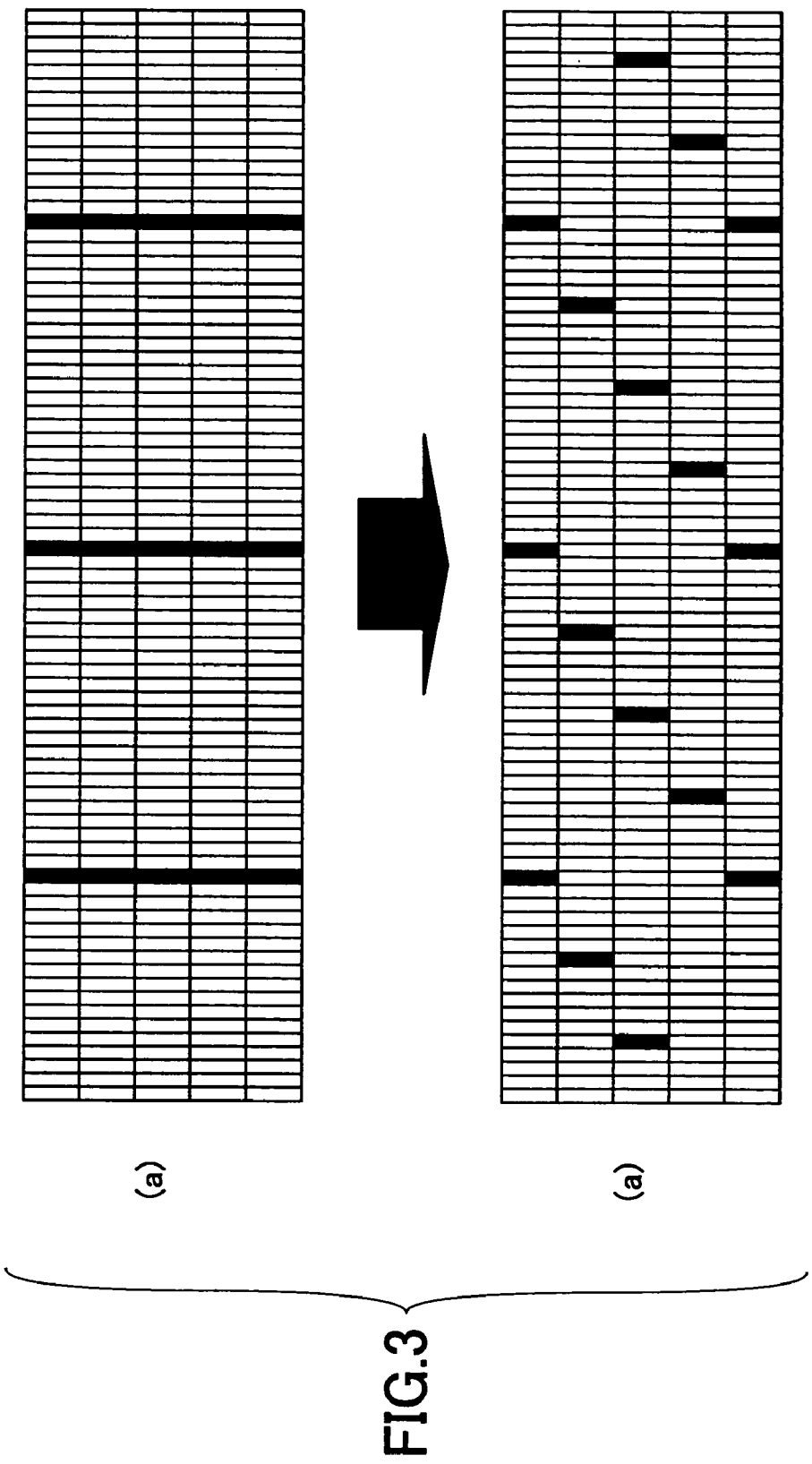
FIG. 3 is a diagram showing pixels of an image in a pixel thinning out process.

Embodiments of the present invention include an image processing apparatus, an image forming apparatus using the image processing apparatus, an image processing method, a computer-readable recording medium storing a program of the image processing method, and an image forming method using the image processing method in which correction of the out of color registration can be executed with a high degree of freedom and a bad influence on a pseudo continuous tone process by the out of color registration can be restrained.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image processing apparatus, an image forming apparatus using the image processing apparatus, an image processing method, a computer-readable recording medium storing a program of the image processing method, and an image forming method using the image processing method particularly pointed out in the specification in such full, clear, concise, and exact terms as to enable a person having ordinary skill in the art to practice the invention.

To achieve one or more of these and other advantages, according to a first embodiment of the present invention, there is provided an image processing apparatus. The image processing apparatus includes a detecting section which detects an amount of an out of color registration in an image forming apparatus of an electrophotographic system and calculates a correction parameter of the out of color registration from the obtained amount of the out of color registration and stores the correction parameter, a correction section which corrects image data to be input to the image forming apparatus based on the correction parameter, and a pseudo continuous tone processing section which applies a pseudo continuous tone process to the image data corrected by the correction section.

According to a second embodiment of the present invention, the detecting section calculates an average changing coefficient of an image height on a photoconductor for a scanning angle of a laser beam on the photoconductor as the correction parameter.

According to a third embodiment of the present invention, the correction section includes at least an enlarging/reducing section which enlarges or reduces the image data by linear correction.

According to a fourth embodiment of the present invention, the pseudo continuous tone processing section controls the number of lines in the pseudo continuous tone process based on the correction parameter.

According to a fifth embodiment of the present invention, the pseudo continuous tone processing section partially controls the number of lines.

According to a sixth embodiment of the present invention, there is provided an image processing apparatus. The image processing apparatus includes a detecting section which detects an amount of an out of color registration in an image forming apparatus of an electrophotographic system, a parameter calculating section which calculates a correction parameter of the out of color registration from the amount of the out of color registration obtained from the detecting section, a storing section which stores the correction parameter calculated by the parameter calculating section, a correction section which corrects image data to be input to the image forming apparatus based on the correction parameter, and a pseudo continuous tone processing section which applies a pseudo continuous tone process to the image data corrected by the correction section.

According to a seventh embodiment of the present invention, the parameter calculating section calculates a skew angle of the image data as the correction parameter.

According to an eighth embodiment of the present invention, the correction section includes at least a shifting section which shifts a pixel of the image data in the sub scanning direction.

According to a ninth embodiment of the present invention, the pseudo continuous tone processing section controls a screen angle based on the correction parameter.

According to a tenth embodiment of the present invention the pseudo continuous tone processing section controls the number of lines in the pseudo continuous tone process based on the correction parameter.

According to an eleventh embodiment of the present invention, the detecting section includes sensors in order to detect the amount of the out of color registration.

According to a twelfth embodiment of the present invention, the pseudo continuous tone processing section is controlled by the skew angle while the correction section executes the correction.

According to a thirteenth embodiment of the present invention, there is provided an image forming apparatus. The image forming apparatus includes the image processing apparatus of the first embodiment.

According to a fourteenth embodiment of the present invention, there is provided an image forming apparatus. The image forming apparatus includes the image processing apparatus of the sixth embodiment.

According to a fifteenth embodiment of the present invention, there is provided an image processing method. The image processing method includes detecting an amount of an out of color registration in an image forming apparatus of an electrophotographic system, calculating a correction parameter of the out of color registration from the amount of the out of color registration, storing the calculated correction parameter, correcting image data to be input to the image forming apparatus based on the correction parameter, and applying a pseudo continuous tone process to the corrected image data.

According to a sixteenth embodiment of the present invention, the correction parameter is a skew angle of the image data, and a screen angle is controlled by the correction parameter.

According to a seventeenth embodiment of the present invention, the number of lines on a screen is controlled in the fifth step.

According to an eighteenth embodiment of the present invention, the amount of the out of color registration is detected before the image forming apparatus is delivered.

According to a nineteenth embodiment of the present invention, there is provided a computer-readable recording medium storing a program of the image processing method of the fifteenth embodiment.

According to a twentieth embodiment of the present invention, there is provided an image forming method which executes the image processing method of the fifteenth embodiment in the image forming apparatus.

According to an embodiment of the present invention, in an image processing apparatus, since an out of color registration of input image data is corrected before a pseudo continuous tone process is applied to the input image data, the degree of freedom in the correction is higher than that of an existing technology. In addition, the correction of the out of color registration is also executed in the pseudo continuous tone process; therefore, a bad influence caused by the out of color registration on the pseudo continuous tone process can be restrained. With this, image quality can be increased.

In addition, since one embodiment of the image processing apparatus includes a detecting section which detects an amount of the out of color registration, even after delivering the image processing apparatus, the amount of the out of color registration can be adjusted. Therefore, it is preferable that the image processing apparatus be used in an apparatus whose characteristics are changed with the passage of time.

In addition, since the image processing apparatus can include a storing section which stores a correction parameter of the out of color registration calculated beforehand from the amount of the out of color registration measured beforehand, cost can be decreased. Further, it is preferable that the image processing apparatus be used in an apparatus whose characteristics are not changed with the passage of time.

In addition, in the image processing apparatus, since the input image data are shifted by a skew angle, output image data can be obtained without skew. With this, the image quality can be increased.

In addition, in the image processing apparatus, since input image data are enlarged or reduced based on errors of a scale factor, output image data can be obtained without skew caused by the errors of the scale factor. With this, the image quality can be increased.

In addition, in the image processing apparatus, since the screen angle of the pseudo continuous tone process is controlled corresponding to the skew angle of the input image data, the output image data having a suitable screen angle can be obtained. Therefore, moire caused by interference with multiple colors is restrained, and the image quality can be increased.

In addition, in the image processing apparatus, since the number of lines in the pseudo continuous tone process is controlled corresponding to the errors of the scale factor, the output tone can be stable with a suitable number of lines. With this, the image quality can be increased.

In addition, in the image processing apparatus, since the number of lines in the pseudo continuous tone process is partially changed, a partial difference of the number of lines can be corrected and an image that does not cause a bad feeling can be obtained.

In addition, an image forming apparatus using the image processing apparatus having the above effects can be obtained.

In addition, an image processing method which is used in the image processing apparatus having the above effects can be obtained.

In addition, a computer-readable recording medium storing a program which executes the image processing method having the above effects can be obtained.

In addition, an image forming method which uses the image processing method having the above effects can be obtained.

BEST MODE OF CARRYING OUT THE INVENTION

A best mode of carrying out the present invention is described with reference to the accompanying drawings.

First Embodiment

Figure 4:
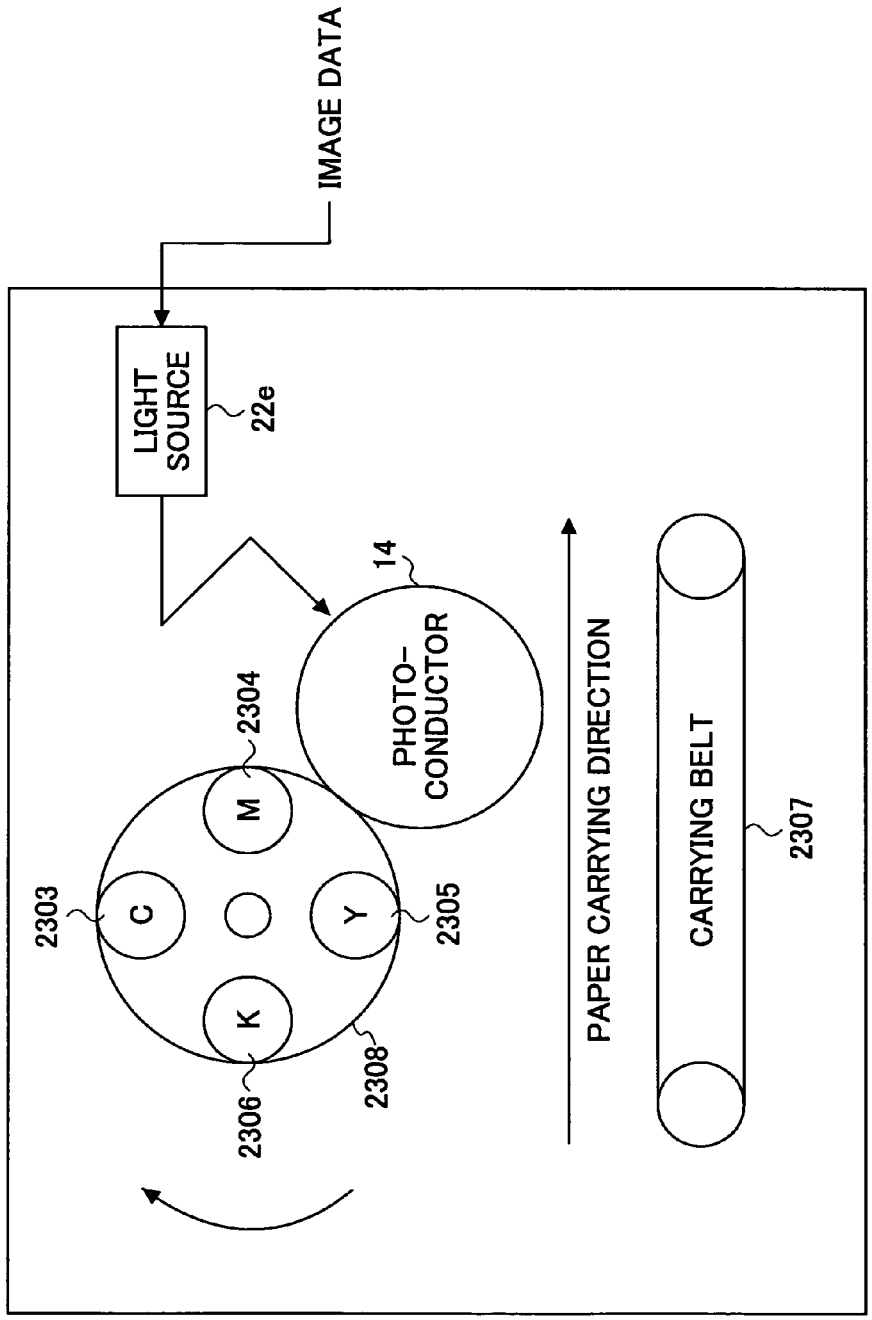
FIG. 4 is a schematic diagram showing a structure of an image forming apparatus according to a first embodiment of the present invention.

First, a first embodiment of the present invention is described. FIG. 4 is a schematic diagram showing a structure of an image forming apparatus according to the first embodiment of the present invention. In FIG. 4, as the image forming apparatus, a color laser printer is used. Image data sent from an external apparatus (not shown) are converted into bitmap data by a driver (not shown). Hereinafter, the bitmap data are referred to as image data.

In the color laser printer, first, a light source 22e emits laser beams corresponding to cyan image data onto a photoconductor 14. The laser beams are irradiated onto the photoconductor 14 via an optical system similar to that shown in FIG. 1. Consequently, static electricity is generated on the photoconductor 14 by a photoelectric effect. Then, cyan toner having an electric charge is supplied to the electrostatically charged photoconductor 14 from a cyan developing section 2303 by rotating a revolver 2308. With this, a cyan (C) toner image is formed on the photoconductor 14.

Similarly, a magenta (M) toner image, a yellow (Y) toner image, and a black (K) toner image are sequentially formed on the photoconductor 14. A paper charged with static electricity is carried by a carrying belt 2307 and the paper is placed in contact with the photoconductor 14. With this, the toner images of C, M, Y, and K are transferred from the photoconductor 14 to be superposed on the paper and a fixing process is applied to the superposed toner images on the paper so that an output image is obtained.

Figure 5:
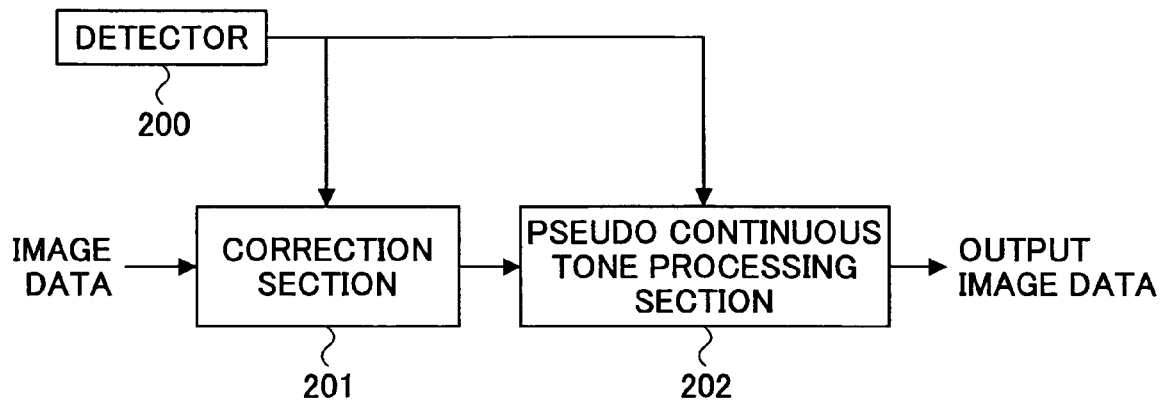
FIG. 5 is a schematic diagram showing a structure of an image processing apparatus according to the first embodiment of the present invention.

FIG. 5 is a schematic diagram showing a structure of an image processing apparatus according to the first embodiment of the present invention. The image processing apparatus shown in FIG. 5 is used in the color laser printer shown in FIG. 4.

First, digital image data of 8 bits and 600 dpi are corrected by a correction section 201 based on a correction parameter read from a detector 200. In the detector 200, the correction parameter for correcting the out of color registration is stored which correction parameter is calculated beforehand from an amount of the out of color registration measured in the color laser printer. The correction parameter is calculated at a position in the main scanning direction. The correction parameter is described below in detail. The image data of 8 bits and 600 dpi are converted into image data of 2 bits and 600 dpi by a pseudo continuous tone processing section 202 based on the correction parameter read from the detector 200. Then, the image data are converted into laser beams and the laser beams are written onto the photoconductor 14.

The correction parameter stored in the detector 200 is determined based on a fθ response characteristic of a fθ lens 34d (refer to FIG. 6) used in the color laser printer which characteristic is measure beforehand. The fθ lens 34d has a characteristic in which an image height "f" linearly changes for a scanning angle θ from an optical axis of the fθ lens 34d.

Figure 6:
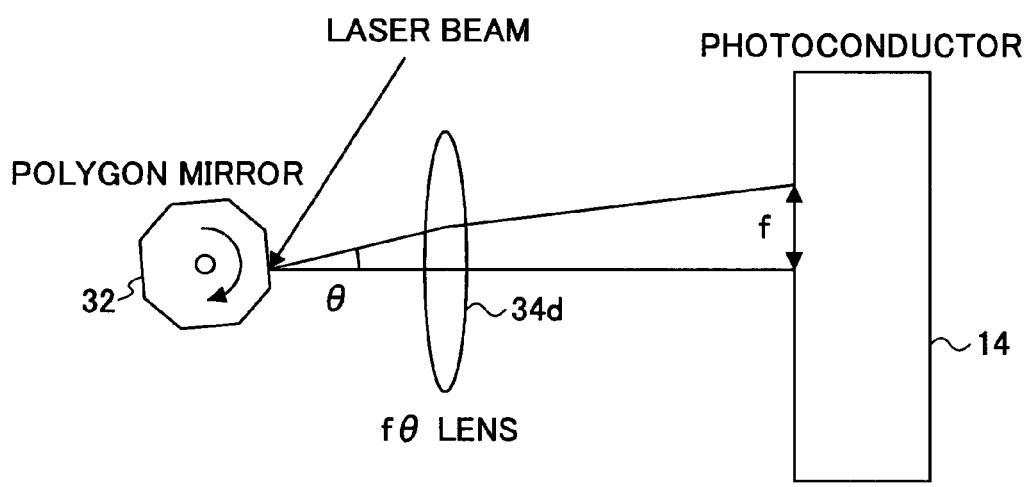
FIG. 6 is a schematic diagram describing a characteristic of a fθ lens.

FIG. 6 is a schematic diagram describing the characteristic of the fθ lens 34d. Referring to FIG. 6, the characteristic of the fθ lens 34d is described in detail.

The scanning angle θ is where the laser beam is deflected by a polygon mirror 32 operating at a constant angular velocity. When the laser beam is scanned on the photoconductor 14 at the constant angular velocity, the distance between pixels on the photoconductor 14 is not a constant. That is, the size of a pixel near the edge of the photoconductor 14 becomes larger than that of a pixel near the center of the photoconductor 14. The fθ lens 34d corrects the sizes of the pixels on the photoconductor 14.

Figure 7:
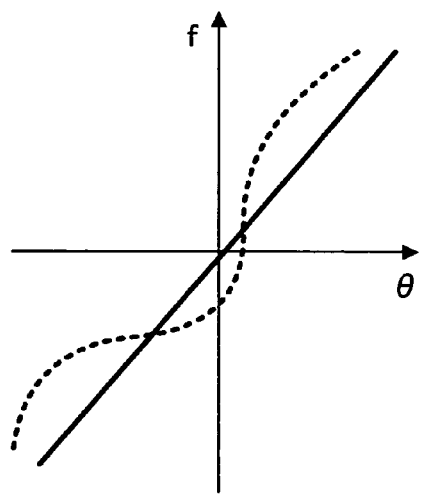
FIG. 7 is a graph showing a relationship between an image height on a photoconductor and a scanning angle of a laser beam on the photoconductor.

FIG. 7 is a graph showing a relationship between the image height "f" and the scanning angle θ. A linear fθ response characteristic shown in the continuous line of FIG. 7 is ideal; however, manufacturing a lens having the linear fθ response characteristic results in high cost so that using such a lens is not realistic. Therefore, actually, the fθ lens 34d having a characteristic shown in the dashed line of FIG. 7 is generally used. The characteristic shown in the dashed line of FIG. 7 is different from the linear characteristic.

When the fθ lens 34d having the characteristic shown in the dashed line of FIG. 7 is used, the sizes of pixels written on the photoconductor 14 are different in the main scanning direction. In the present embodiment, the fθ response characteristic that is different from the ideal is corrected.

Next, an actual calculation method of the correction parameter is described. First, an fθ response characteristic similar to that shown in the dashed line of FIG. 7 is obtained by measuring. Next, a writable scanning region on the photoconductor 14 is equally divided into small regions of 60 pixels, and an average changing coefficient α of the image height "f" for the change of the scanning angle θ is obtained in each small region.

Specifically, the average changing coefficient α is obtained by the following methods. In the present embodiment, the writable scanning region on the photoconductor 14 is approximately 300 mm, and the scanning angle to the photoconductor 14 is approximately 120 degrees. In addition, since writing an image of 600 dpi is assumed, approximately 7000 pixels (300×600/25.4≈7000) can exist in the main scanning direction. Therefore, the scanning angle per pixel is approximately 0.017° (120/7000≈0.017°), and the length per pixel on the photoconductor 14 is approximately 0.042 mm (25.4/600≈0.042). That is, first, the image height changing distance is measured for the scanning angle change of 0.017°, and the changing coefficient per pixel is obtained by dividing the measured result by 0.042 mm. Then, the average changing coefficient α is obtained by averaging the changing coefficients in the small region.

The correction parameter is determined to be 0.95, 1.0, or 1.05 whichever is the nearest value of the measured average changing coefficient α. Since the response characteristic of the fθ lens 34d is large and does not change with the passage of time, when the correction parameter is once determined before delivering the color laser printer, it is not necessary to adjust the correction parameter at the time of maintenance.

In the above description, the average changing coefficient α is obtained in each 60 pixels; however, the average changing coefficient α can be obtained in each small region of more than 60 pixels, and the small regions do not need to be the same size. For example, the writable scanning region on the photoconductor 14 can be divided into small regions corresponding to the response characteristic of the fθ lens 34d.

Figure 8:
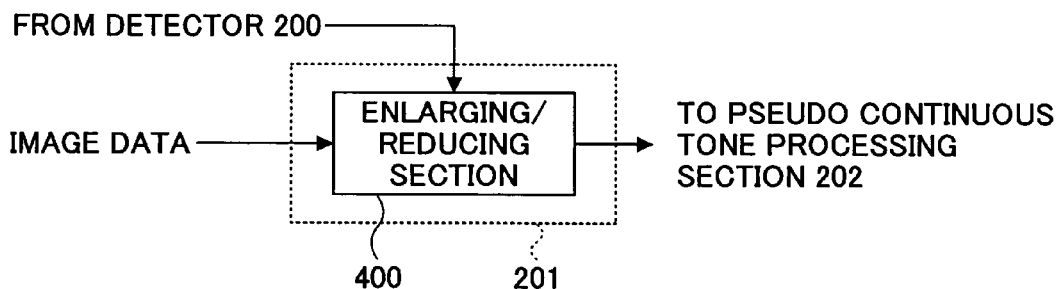
FIG. 8 is a schematic diagram showing a correction section shown in FIG. 5.

Next, the correction section 201 shown in FIG. 5 is described in detail. FIG. 8 is a schematic diagram showing the correction section 201 shown in FIG. 5. In the present embodiment, as shown in FIG. 8, the correction section 201 includes only an enlarging/reducing section 400. The enlarging/reducing section 400 applies an enlarging or reducing process to each small region of 60 pixels in the main scanning direction in which region the average changing coefficient α is obtained. That is, enlarging or reducing conversion by linear correction is applied in the small region of 60 pixels in which the center pixel position c=30. When the pixel position of a target pixel in the small region is X and the target pixel is moved to a suitable position X' after the conversion, Equation 1 can be obtained.

$$X' = \frac{1}{\alpha} \times (X - c) + c \qquad \text{Equation 1}$$

By using Equation 1, the moving position of each pixel can be determined. The pixel position after the conversion is not always a position of an integer; therefore, a pixel value of a pixel whose position is an integer is obtained by a correction operation.

An actual calculating process of the pixel value is described. As an example, a pixel value of a pixel position X'=20 is obtained. For example, when the average changing coefficient α=1.05, pixels nearest to the pixel position X'=20 are pixels of the pixel positions X'=19.5 and X'=20.5, and actually, pixels of the pixel positions X=20 and X=21. When it is defined that the pixel value of the pixel position X=20 is $I_{20}$ and the pixel value of the pixel position X=21 is $I_{21}$, the pixel value of the pixel position X'=20 is $I'_{20}$ can be obtained by Equation 2.

$$I'_{20} = \frac{I_{20} \times |20 - 20.5| - I_{21} \times |20 - 19.5|}{|20.5 - 19.5|} \qquad \text{Equation 2}$$

When the above process is applied to the 60 pixels to be output, the enlarging or reducing of pixels can be executed.

Even if the reducing process by the linear correction is executed, when the scale factor is almost 1, the possibility of losing pixel value information is small. Consequently, the loss of thin lines by the thinning out process does not occur.

Next, the pseudo continuous tone processing section 202 shown in FIG. 5 is described. The pseudo continuous tone processing section 202 executes a line screen process. In the line screen process, pixel values of several pixels (2 to 4 pixels in the present embodiment) are all added and the writing length of the region is changed by the added pixel value.

Figure 9:
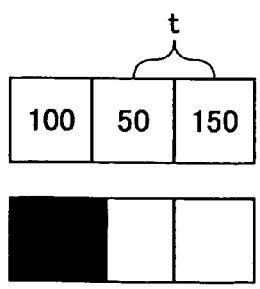
FIG. 9 is a diagram showing a pseudo continuous tone process.

FIG. 9 is a diagram showing the pseudo continuous tone process. In FIG. 9, each square "t" shows one pixel and an integer in the square shows a pixel value. In FIG. 9, the sum of three pixels is 300, and since each pixel is composed of 8 bits, the maximum value of the sum is 765. Therefore, the writing length becomes 300/765×3 (pixels). Generally, in laser beam writing in a color laser printer, when the writing length is small, the output becomes unstable. Therefore, pixel values of several pixels are added and the added pixel value is written once and the writing length of one time is made large. With this, the output can be stable.

Figure 10:
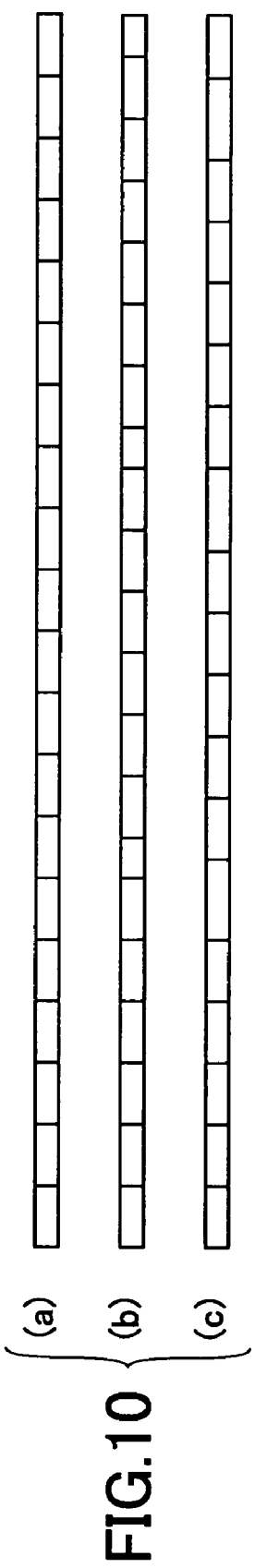
FIG. 10 is a diagram showing a line screen process according to the first embodiment of the present invention.

In the present embodiment, the line screen process (pseudo continuous tone process) is applied to one group of the 60 pixels. FIG. 10 is a diagram showing the line screen process according to the first embodiment of the present invention.

First, when the average changing coefficient α is 1.0, the line screen process is applied to the three-pixel unit in the all 60 pixels (FIG. 10(a)), then, a pixel having a peak is likely to appear once in three pixels. Since the 60 pixels equal approximately 0.1 inch, 200 lines/inch are output. Next, when the average changing coefficient α is 0.95, after the line screen process for the three-pixel unit is executed six times, the line screen process of a two-pixel unit is executed once, and the above line screen process is repeated three times (FIG. 10(b)). Then, since 21 pixels each having a peak are likely to appear in 60 pixels, pseudo 210 lines can be output. Similarly, when the average changing coefficient α is 1.05, after the line screen process for the three-pixel unit is executed five times, the line screen process of a four-pixel unit is executed once, the above line screen process is repeated three times, and the line screen process for the three-pixel unit is executed once (FIG. 10(c)). Then, pseudo 190 lines can be output. In the present embodiment, since it is assumed that an image of 600 dpi is output, the bad effect of the pseudo 210 lines or 190 lines may be noticeable; however, in the high resolution of 1200 dpi or 2400 dpi, the bad effect of the output may be unnoticeable.

Figure 11:
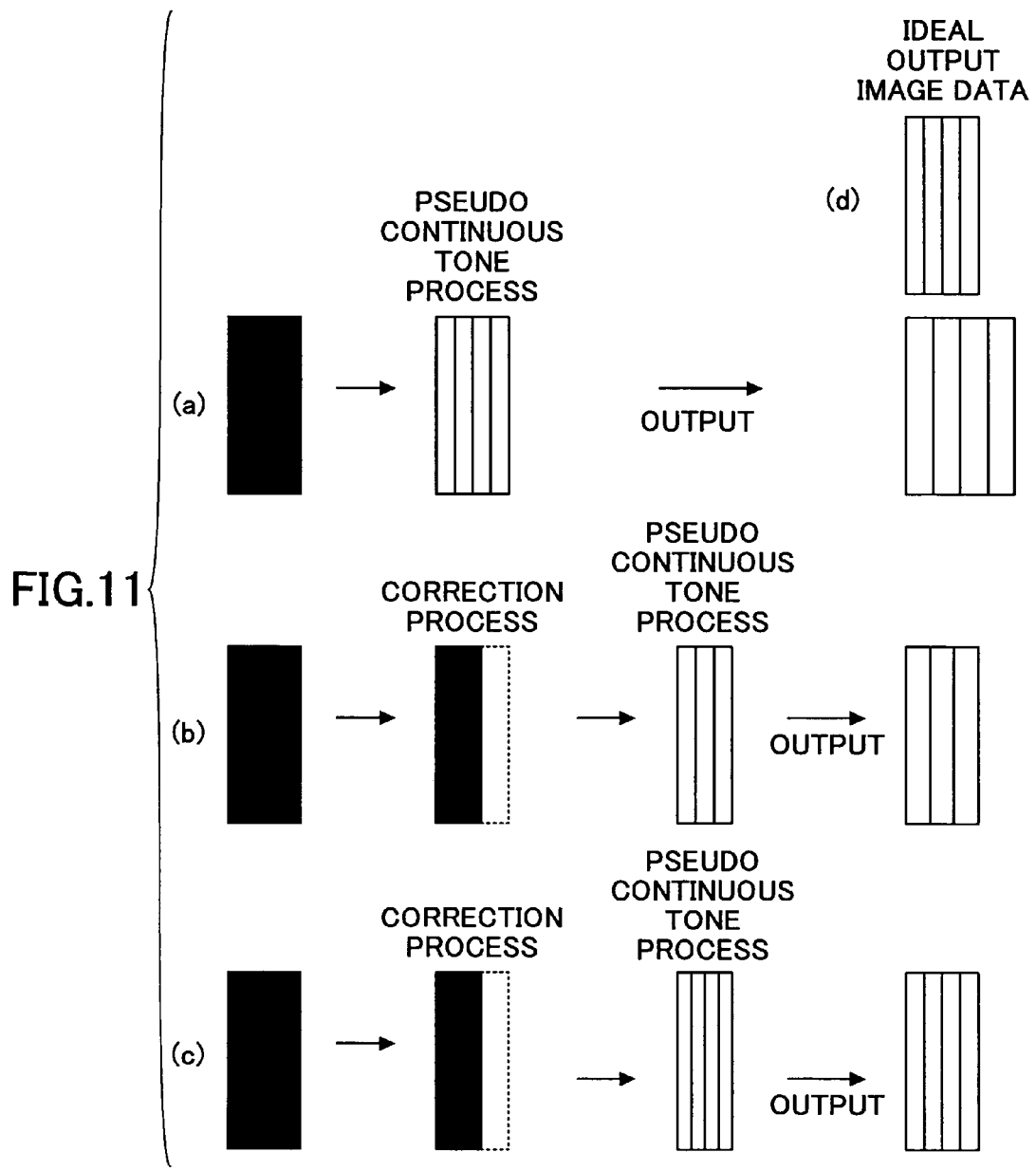
FIG. 11 is a diagram showing output image data in three different image processing methods for illustrating the first embodiment of the present invention.

Next, a controlling process of the pseudo continuous tone process based on the enlargement or reduction by the enlarging/reducing section 400 is described. FIG. 11 is a diagram showing output image data in three different image processing methods for illustrating the first embodiment of the present invention. Ideal output image data are shown in FIG. 11(d), and cases are studied in which cases image data wider than the ideal image data are output due to insufficient accuracy of the fθ lens 34d.

FIG. 11(a) shows a case where the correction process (enlarging/reducing process) is not applied and the pseudo continuous tone process is applied to the input image data. In this case, image data wider than the ideal image data are output.

Figure 12:
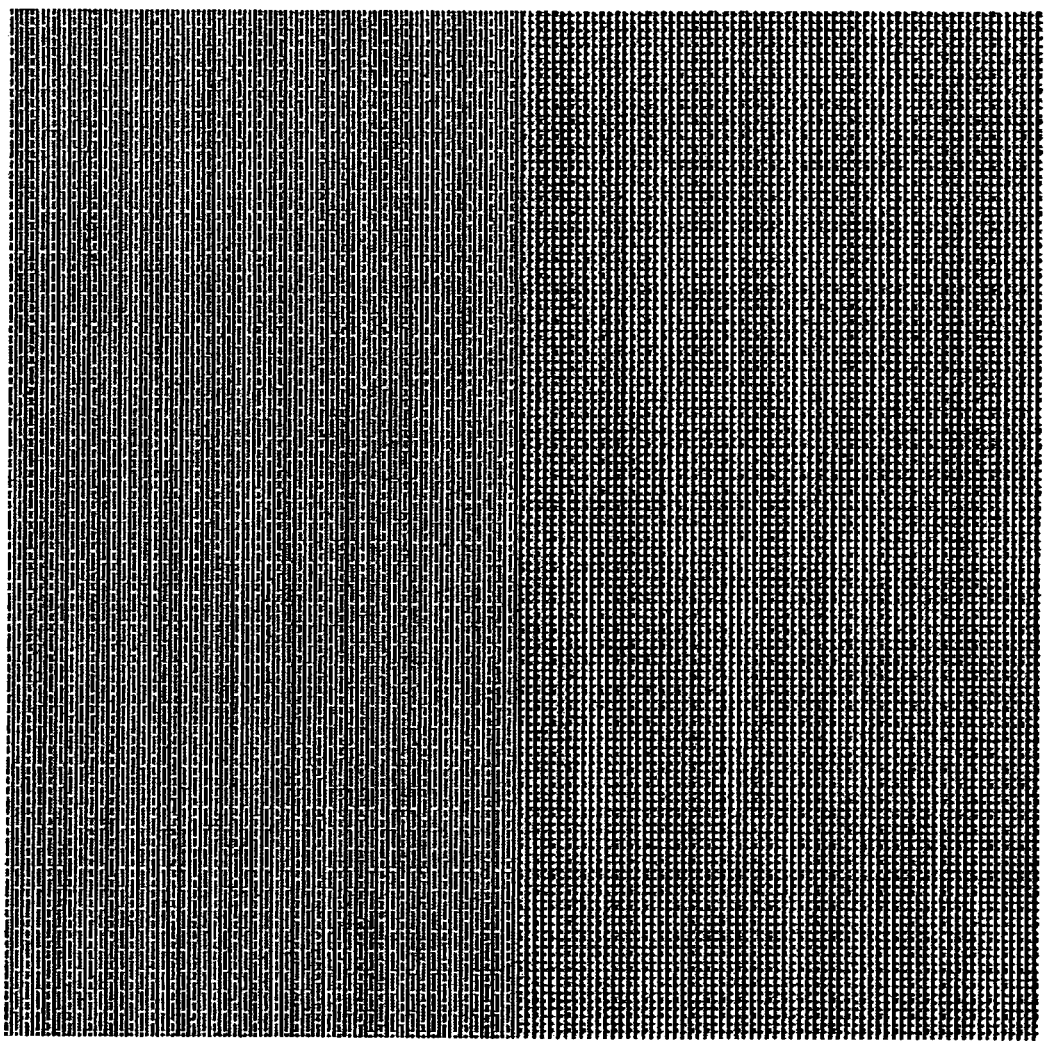
FIG. 12 is a diagram showing an example of image data which give a strange feeling due to a difference of the number of lines.

FIG. 11(b) shows a case where the reducing process is applied by assuming that the image data are widened and the pseudo continuous tone process is applied. In this case, the output range of the image data is the same as that of the ideal image data; however, the number of lines is less than that of the ideal image data. At this time, since the number of lines in the image data is not uniform, the image data give a strange feeling. FIG. 12 is a diagram showing an example of image data which give a strange feeling due to a difference of the number of lines. As shown in FIG. 12, a strange feeling is given by the image data. In FIG. 12, at the left side, a tone is expressed by a binary image of 200 lines, and at the right side, the same tone is expressed by the binary image of 250 lines. Actually, the difference as shown in FIG. 12 does not occur; however, in order to understand the difference, FIG. 12 is exaggerated.

FIG. 11(c) shows a case where the pseudo continuous tone process is controlled after applying the enlarging/reducing process to input image data. In FIG. 11(c), in the pseudo continuous tone process, when the output image data are assumed to have been widened, the number of lines is controlled to be small, and when the output image data are assumed to have been narrowed, the number of lines is controlled to be large. With this, the image data having the ideal number of lines are output. Consequently, the number of lines becomes uniform and excellent image data without a strange feeling can be output.

In the above description, three average changing coefficients α are used. However, when the small region where the average changing coefficients α are obtained and the controlling method of the number of lines are suitably determined, four or more average changing coefficients α can be determined, and image processing based on the determined average changing coefficients α can be executed.

Second Embodiment

Next, referring to drawings, a second embodiment of the present invention is described. The color laser printer in the second embodiment is the same as that in the first embodiment; therefore, the same description is omitted.

Figure 13:
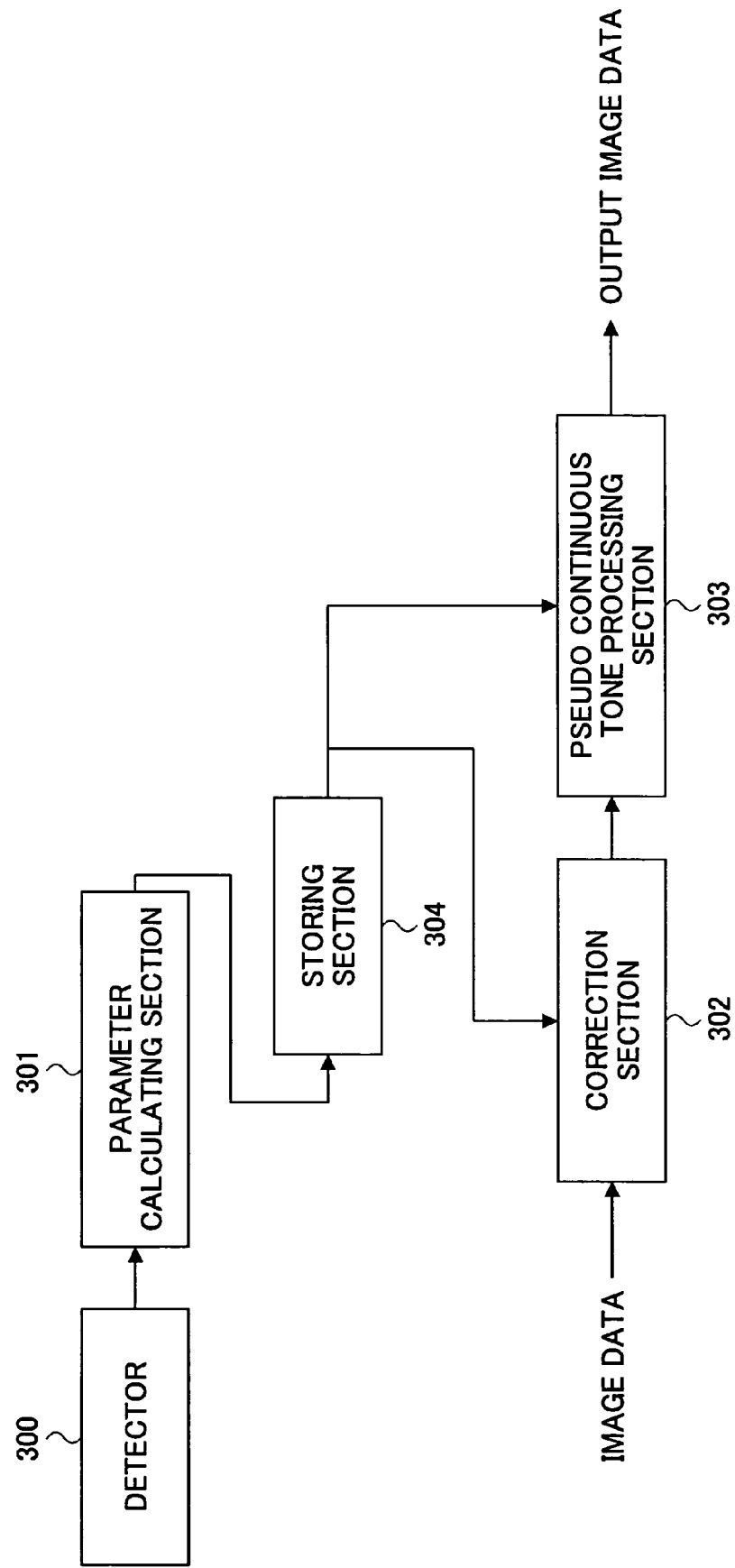
FIG. 13 is a schematic diagram showing a structure of an image processing apparatus according to a second embodiment of the present invention.

In the second embodiment of the present invention, an image processing apparatus shown in FIG. 13 is used instead of using the image processing apparatus shown in FIG. 5. FIG. 13 is a schematic diagram showing a structure of an image processing apparatus according to the second embodiment of the present invention.

In the image processing apparatus shown in FIG. 13, first, in order to calculate the correction parameter, detection data detecting the amount of the out of color registration of the color laser printer are obtained beforehand. The detection data are obtained, for example, before delivering the color laser printer to a user or at the time of performing maintenance on the color laser printer. The method for obtaining the detection data is described below. A detector 300 stores the detection data after detecting them.

As described above, the detector 300 detects the amount of the out of color registration of the color laser printer. A parameter calculating section 301 calculates a skew angle based on the detection data detected by the detector 300. The calculated skew angle is stored in a storing section 304. A correction section 302 corrects image data of 8 bits and 600 dpi based on the calculated skew angle. A pseudo continuous tone processing section 303 applies a pseudo continuous tone process to the image data of 8 bits and 600 dpi based on the calculated skew angle and converts the image data of 8 bits and 600 dpi into image data of 2 bits and 600 dpi. After this, as described in FIG. 1, the image data are converted into laser beams and the laser beams are written on the photoconductor 14.

Figure 14:
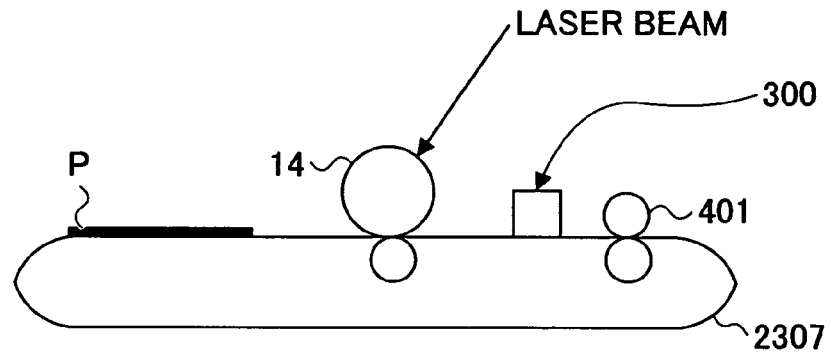
FIG. 14 is a schematic diagram showing image data outputting processes.

FIG. 14 is a schematic diagram showing image data outputting processes. As described above, in the image data outputting processes, image data are written onto the photoconductor 14 to form a latent image by laser beams, the latent image on the photoconductor 14 is developed and the developed toner image is transferred onto a paper, and the superposed toner image is fixed by a fixing section 401. Then, the fixed toner image is output as output image data.

In the present embodiment, the detector 300 is disposed over the carrying belt 2307 at a position between the photoconductor 14 and the fixing section 401, that is, the detector 300 is disposed at a position between transferring of image data on the paper and fixing the image data. Then, the detector 300 detects the detection data for calculating the skew angle. The detector 300 includes three sensors arrayed in the direction orthogonal to the carrying direction of paper P, and each sensor is composed of a semiconductor laser beam emitting device and a photodiode for detecting light reflected from the paper P.

Figure 15:
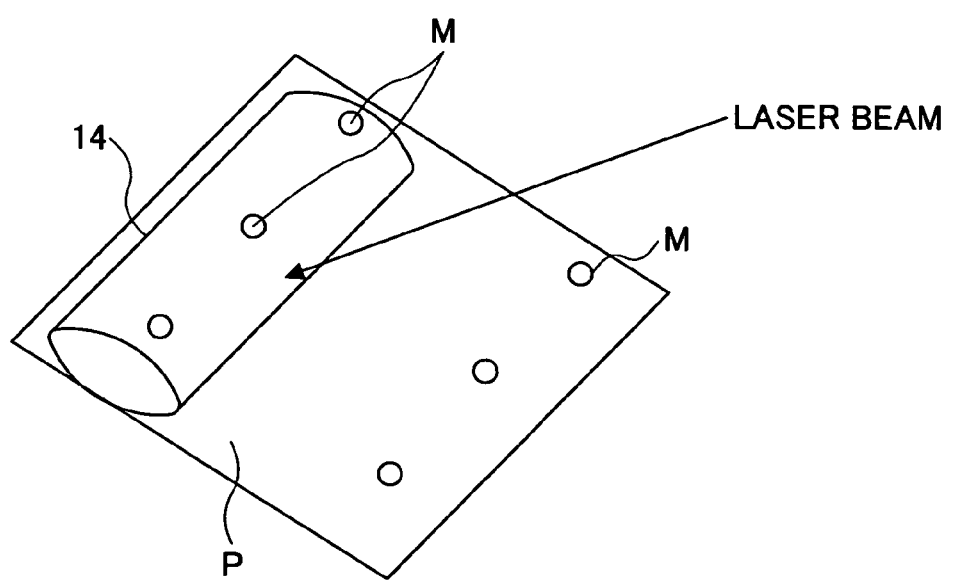
FIG. 15 is a schematic diagram showing a method of forming markers on the photoconductor and a paper.

FIG. 15 is a schematic diagram showing a method of forming markers on the photoconductor 14 and the paper P. In order to obtain the detection data of the out of color registration, as shown in FIG. 15, markers M are written on the photoconductor 14 by laser beams, and toners positioned at the markers M are developed. The markers M are written at positions corresponding to the sensors of the detector 300 along the main scanning direction. The developed toners of the markers M are transferred onto the paper P. While the paper P is being carried, the sensors of the detector 300 are turned on, that is, the semiconductor laser emitting devices are turned on, and the photodiodes monitor light reflected from the markers on the paper P. When the paper P is carried to the detector 300, since the reflectance of the paper P is relatively large, the outputs from the photodiodes become large. However, when the marker passes through under the sensor, since the reflectance from the marker is small, the output from the photodiode becomes small. The times when the outputs from the photodiodes become small are defined as $T_0$, $T_1$, and $T_2$, respectively, corresponding to the three photodiodes. In this, $T_1$ is the time obtained from the center photodiode.

Next, the parameter calculating section 301 calculates a skew angle θ based on the times $T_0$, $T_1$, and $T_2$ obtained from the detector 300, a distance $L_{01}$ between the two photodiodes and a distance $L_{12}$ between the two photodiodes, and the carrying velocity V of the paper P by Equation 3. The obtained skew angle θ is stored in the storing section 304. In this, the skew angle θ is determined to be +5°, 0°, or −5° which is the nearest value of the obtained skew angle θ.

$$\theta = \frac{\arctan\left(\frac{VT_1 - VT_0}{L_{01}}\right) + \arctan\left(\frac{VT_2 - VT_0}{L_{12}}\right)}{2} \quad \text{Equation 3}$$

Figure 16:
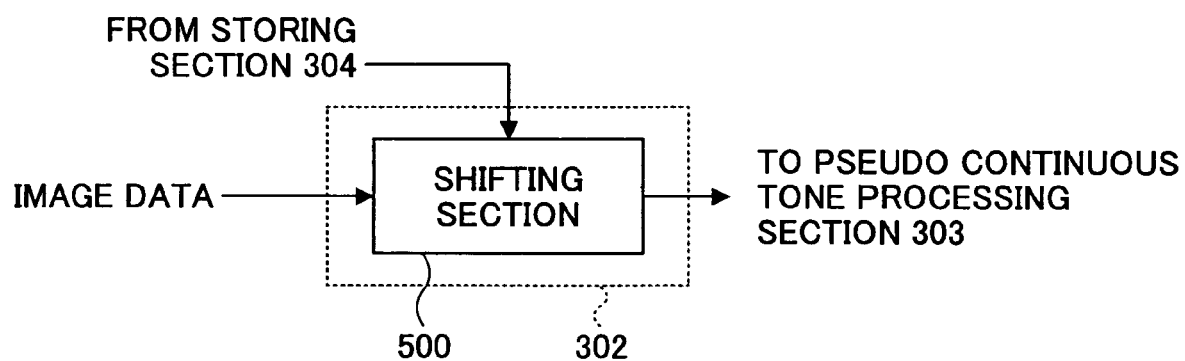
FIG. 16 is a schematic diagram showing a correction section shown in FIG. 13.
Figure 17:
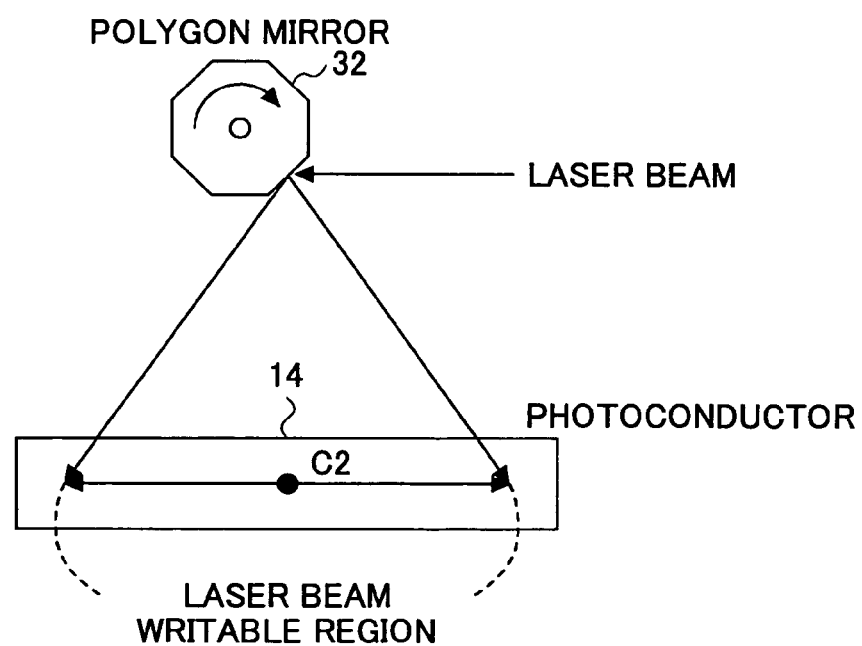
FIG. 17 is a schematic diagram showing a laser beam writable region on the photoconductor.

FIG. 16 is a schematic diagram showing the correction section 302 shown in FIG. 13. As shown in FIG. 16, in the present embodiment, the correction section 302 includes only a shifting section 500. The shifting section 500 moves the position of a pixel in the sub scanning direction based on the skew angle θ read from the storing section 304. FIG. 17 is a schematic diagram showing a laser beam writable region on the photoconductor 14. When it is defined that the center of the laser beam writable region is C2, the original pixel position is X, and the moved pixel position is Y; the moved pixel position Y is expressed by "Y=(X−C2)×tan θ. In this, the moved pixel position obtained by the shifting section 500 is not always an integer. Therefore, the correction operation described in the first embodiment is applied to the moved pixel position.

Figure 18:
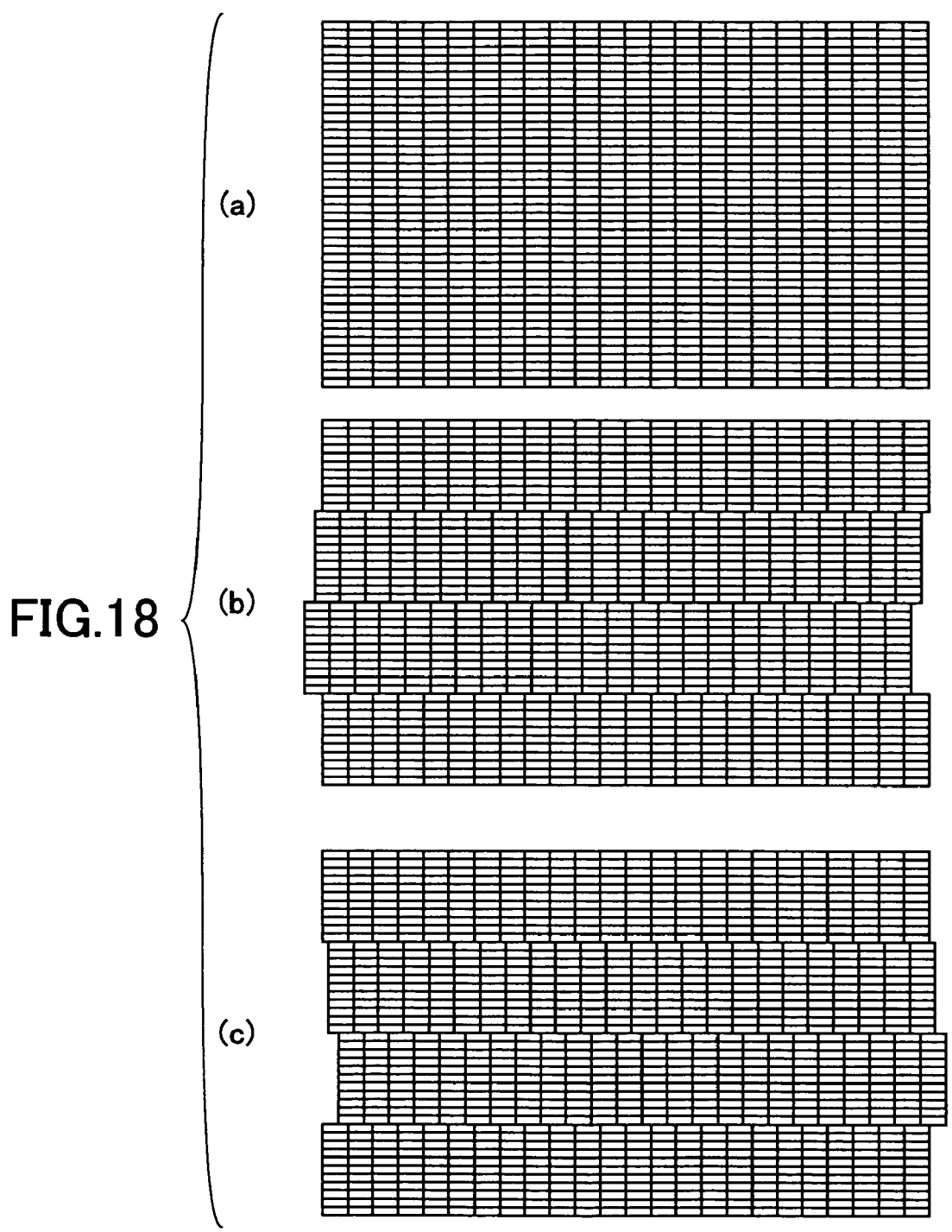
FIG. 18 is a diagram showing a line screen process according to the second embodiment of the present invention.

Similar to the first embodiment, the pseudo continuous tone processing section 303 executes a line screen process. However, in the second embodiment of the present invention, the line screen process is applied to each three-pixel unit. FIG. 18 is a diagram showing the line screen process according to the second embodiment of the present invention.

When the skew angle θ read from the storing section 304 is 0°, a normal line screen process is executed (FIG. 18(a)). When the skew angle θ read from the storing section 304 is 5°, a line screen process is executed in which the writing start position is shifted one dot to the left every 11 pixels in the sub scanning direction (FIG. 18(b)). When the skew angle θ read from the storing section 304 is −5°, a line screen process is executed in which the writing start position is shifted one dot to the right every 11 pixels in the sub scanning direction (FIG. 18(c)). With this, the line screen process can be executed in the reverse direction of the skew angle θ with the same size.

Figure 19:
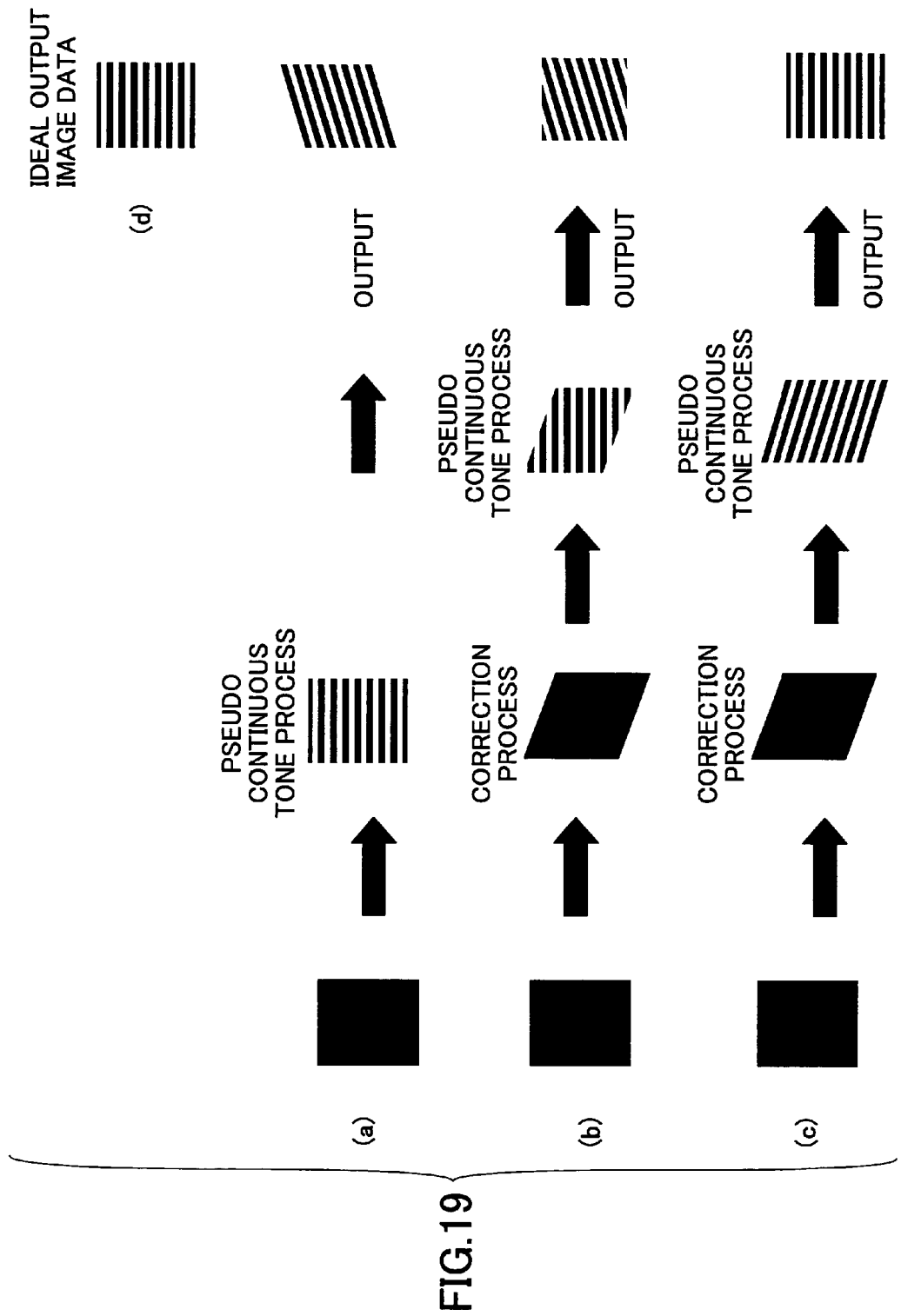
FIG. 19 is a diagram showing output image data in three different image processing methods for illustrating the second embodiment of the present invention.

FIG. 19 is a diagram showing output image data in three different image processing methods for illustrating the second embodiment of the present invention. Referring to FIG. 19, the controlling process of the pseudo continuous tone process is described.

Ideal output image data are shown in FIG. 19(d). When only a general pseudo continuous tone process is applied to input image data, since skewing of an image actually occurs, the output image data become image data as shown in FIG. 19(a). When only the correction process (shifting process) is applied to the input image data, since the general pseudo continuous tone process is applied to the shifted image data, as shown in FIG. 19(b), image data whose screen angle is shifted from the ideal output image data are output. The screen angle in a color laser printer is precisely determined so that moire caused by interference with multi colors is restrained.

For example, when the skew angle θ of C (cyan) image data is different from that of K (black) image data, the moire may not be restrained. Therefore, when the shifting process is applied to the input image data and the pseudo continuous tone process is applied to the corrected image data by controlling the pseudo continuous tone process based on the skew angle θ, as shown in FIG. 19(c), ideal output image data in which the moire is restrained can be obtained.

The image processing methods described above can be executed by a computer. In this case, the programs are stored in a recording medium and the computer executes the programs by reading them from the recording medium.

Further, the present invention is not limited to the specifically disclosed embodiments, and variations and modifications may be made without departing from the scope of the present invention.

The present invention is based on Japanese Priority Patent Application No. 2005-313087, filed on Oct. 27, 2005, with the Japanese Patent Office, the entire contents of which are hereby incorporated by reference.

What is claimed is:

1. An image processing apparatus, comprising:
   a detecting section to detect an amount of an out of color registration in the image forming apparatus of an electrophotographic system and to calculate a correction parameter of the out of color registration from the detected amount of the out of color registration and to store the correction parameter, wherein the detecting section calculates an average changing coefficient of an image height on a photoconductor for a scanning angle of a laser beam on the photoconductor as the correction parameter;
   a correction section to correct image data to be input to the image forming apparatus based on the correction parameter; and
   a pseudo continuous tone processing to apply a pseudo continuous tone process to the image data corrected by the correction section based on the correction parameter to the image data corrected by the correction section.

2. The image processing apparatus as claimed in claim 1, wherein:
   the correction section includes at least an enlarging/reducing section to enlarge or reduce the image data by linear correction.

3. The image processing apparatus as claimed in claim 1, wherein:
   the pseudo continuous tone processing section controls a number of lines in the pseudo continuous tone process based on the correction parameter.

4. The image processing apparatus as claimed in claim 3, wherein:
   the pseudo continuous tone processing section partially controls the number of lines.

5. An image forming apparatus, comprising:
   the image processing apparatus as claimed in claim 1.

6. An image processing method, comprising:
   detecting an amount of an out of color registration in the image forming apparatus of an electrophotographic system and to calculate a correction parameter of the out of color registration from the detected amount of the out of color registration and to store the correction parameter;
   calculating an average changing coefficient of an image height on a photoconductor for a scanning angle of a laser beam on the photoconductor as the correction parameter;
   correcting image data to be input to the image forming apparatus based on the correction parameter; and
   applying a pseudo continuous tone process to the image data corrected based on the correction parameter.

7. The image processing method as claimed in claim 6, further comprising; enlarging or reducing the image data by linear correction.

8. The image processing method as claimed in claim 6, further comprising: controlling a number of lines in the pseudo continuous tone process based on the correction parameter.

9. The image processing method as claimed in claim 8, further comprising: partially controlling the number of lines.

* * * * *